United States Patent [19]

Teicher

[11] Patent Number: 5,206,488
[45] Date of Patent: Apr. 27, 1993

[54] CREDIT CARD SYSTEM INCLUDING A CENTRAL UNIT AND A PLURALITY OF LOCAL UNITS FOR CONDUCTING LOW-COST TRANSACTIONS

[75] Inventor: Mordechai Teicher, 9 Gordon St., Kfar Saba 44260, Israel

[73] Assignee: Mordechai Teicher, Kfar Saba, Israel

[21] Appl. No.: 362,785

[22] Filed: Jun. 7, 1989

[51] Int. Cl.⁵ .............................................. G06F 7/08
[52] U.S. Cl. ................................. 235/380; 235/381; 235/383; 340/825.34; 902/22
[58] Field of Search ............... 235/379, 380, 381, 383; 364/408, 406; 902/8, 22, 24; 340/825.33, 825.34

[56] References Cited

U.S. PATENT DOCUMENTS

| | | | |
|---|---|---|---|
| 3,851,650 | 7/1989 | Kitade | 235/379 |
| 4,186,871 | 2/1980 | Anderson et al. | 235/380 |
| 4,197,986 | 4/1980 | Nagata | 235/379 |
| 4,423,316 | 12/1983 | Sano | 235/379 |
| 4,485,300 | 11/1984 | Peirce | 235/379 |
| 4,639,889 | 1/1987 | Matsumoto et al. | 235/379 |
| 4,778,983 | 10/1988 | Ushikubo | 235/381 |
| 4,809,837 | 3/1989 | Hayashi | 235/381 |
| 4,818,854 | 4/1989 | Davies et al. | 235/381 |
| 4,857,714 | 8/1989 | Sunyich | 235/381 |
| 4,864,506 | 9/1989 | Storace | 235/381 |
| 4,877,947 | 10/1989 | Mori | 235/381 |
| 4,884,212 | 11/1989 | Stutsman | 221/5 |
| 4,900,903 | 2/1990 | Wright et al. | 235/381 |
| 4,935,608 | 6/1990 | Tanaka | 364/405 |

FOREIGN PATENT DOCUMENTS

| | | |
|---|---|---|
| 0200343 | 11/1986 | European Pat. Off. |
| 2260143 | 8/1975 | France |
| 2268317 | 11/1975 | France |
| 2592188 | 6/1987 | France |

Primary Examiner—Eugene R. LaRoche
Assistant Examiner—Christopher Glembocki
Attorney, Agent, or Firm—Benjamin J. Barish

[57] ABSTRACT

A credit card system comprises a central unit and plurality of local units communicating with the central unit. The central unit includes a central storage device for each subscriber for storing amounts to be charged to the respective subscribers, and each of the local units includes a plurality of local storage devices assignable to the subscribers, at least one card reader for receiving a subscriber's card and for enabling the subscriber to open a local account, to transfer thereto a predetermined sum from the central unit, and thereafter to order local transactions involving the sale of products or services from the local account, until a specified permitted sum is in the local account. When the local account drops below the permitted sum, a transfer is automatically effected from the subscriber's central storage device. The system thus performs both local and central transactions while minimizing communication with the central unit, thereby enabling credit card transactions of low value, and at high-speed.

19 Claims, 10 Drawing Sheets

MAIN Procedure

FIG. 1

FIG. 2 — USER INTERFACE

FIG. 2a — USER INTERFACE IN A NETWORK, ON A READER WHICH HAS NO OPEN/CLOSE-ACCOUNT BUTTONS

FIG. 2b — USER INTERFACE IN A NETWORK, ON A READER DEDICATED FOR OPENING AND CLOSING ACCOUNTS

FIG. 2c — USER INTERFACE IN A NETWORK, ON A READER DEDICATED FOR OPENING ACCOUNTS

FIG. 3 — MAIN Procedure

FIG. 4 — CLOSE ACCOUNT Procedure

Fig. 5 — NEW MEMBER Procedure

Fig. 6 — REFILL ACCOUNT Procedure

FIG. 7 — WRAP-UP Procedure

CREDIT CARD SYSTEM INCLUDING A CENTRAL UNIT AND A PLURALITY OF LOCAL UNITS FOR CONDUCTING LOW-COST TRANSACTIONS

BACKGROUND OF THE INVENTION

The present invention relates to a credit card system, and particularly to one which includes a plurality of card readers at various locations enabling the subscribers to charge various items, involving the sale of a product or service, to their account at a central location.

The term "credit card", as used herein, is intended to include not only the usual credit cards whose users enjoy credit allowances, but also debit cards which are now finding widespread use to allow an immediate debiting to the user's account at the moment of the transaction.

More and more payments are carried out using credit cards (which term also includes debit cards, as noted above) insertable into card readers at various locations and communicating with a data base at a central location. However, such communication between local card readers and the central data base is relatively expensive, and the use of such a system for low value transactions is therefore normally not economically feasible. Thus, most vending machines do not allow credit card payments because of the relatively high expense, compared to the value of the transaction, involved in providing communication between the card reader and the central data base for payment approval. In addition, credit cards are not generally used to make payments for train tickets, toll charges, vending machines, etc., because of the time delay inherent in obtaining payment approval from the central data base, which time delay would cause undue congestion at the ticket gates, toll booths, vending machines, etc.

OBJECTS AND SUMMARY OF THE INVENTION

An object of the present invention is to provide a credit card system which may be used for performing both local and central transactions, while minimizing communication between the local card reader and the central data base, thereby enabling credit card transactions of low value to be performed at relatively low cost.

Another object of the invention is to provide a credit card system which may include a high-speed payment approval procedure with the central data base, thereby enabling the system to be used for high-speed transactions, such as for making payments for train tickets, toll booths, vending machines, and the like.

According to the present invention, there is provided a credit card system for a plurality of subscribers each having a subscriber account and a credit card identifying the subscriber account, comprising a communicating with the central unit. The central unit includes a central storage device for each subscriber's account for storing amounts to be charged to the respective subscriber's account. Each of the local units includes a plurality of local storage devices assignable to the subscriber's account; at least one card reader for receiving a subscriber's card when inserted therein to order a transaction involving the sale of a product or service, and for identifying the subscriber's account; and an Open-Account means enabling a subscriber of the central unit, upon inserting the subscriber's card into the card reader of the local unit, to open a local account in the respective local unit, to be assigned a local storage device, and to transfer and store a predetermined amount from the subscriber's central storage device to the subscriber's local storage device. Each of the local units further includes validating means for comparing the cost of the ordered transaction with the amount stored in the subscriber's local storage device, and for validating the transaction if the cost does not exceed the stored amount by a specified permitted sum; and means effective upon validating the transaction for subtracting the cost thereof from the amount stored in the subscriber's local storage device.

According to further preferred features in the preferred embodiment of the invention described below, each of the local units further includes display means for displaying whether or not the transaction has been validated, and the amount remaining in the subscriber's local storage device; and means, effective when the amount stored in the local storage unit drops below a specified minimum, to automatically transfer a predetermined amount from the subscriber's central storage device to the subscriber's local storage device.

Each of the local units in the described system further includes a depressible Close-Account button enabling a subscriber, upon inserting his credit card into the card reader of the local unit, to close the subscriber's local account and to retransfer the balance in the subscriber's local storage device to the subscriber's central storage device; and means, effective upon the local storage device of a specific subscriber being inactive for a specified period of time, to automatically close the local account of the respective subscriber and to retransfer the balance in the subscriber's local storage device to the subscriber's central storage device.

The novel system of the present invention is particularly useful where there are a plurality of central units for different groups of subscribers; each of the central units including a central storage device for each subscriber of the respective group for storing amounts to be charged to the subscribers of the respective group; all the central units communicating with the plurality of local units.

The invention is also usable wherein at least some of the local units include a local network servicing a plurality of card readers at least some of which have an Open-Account means, e.g., a depressible button.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall System

Figure 1:
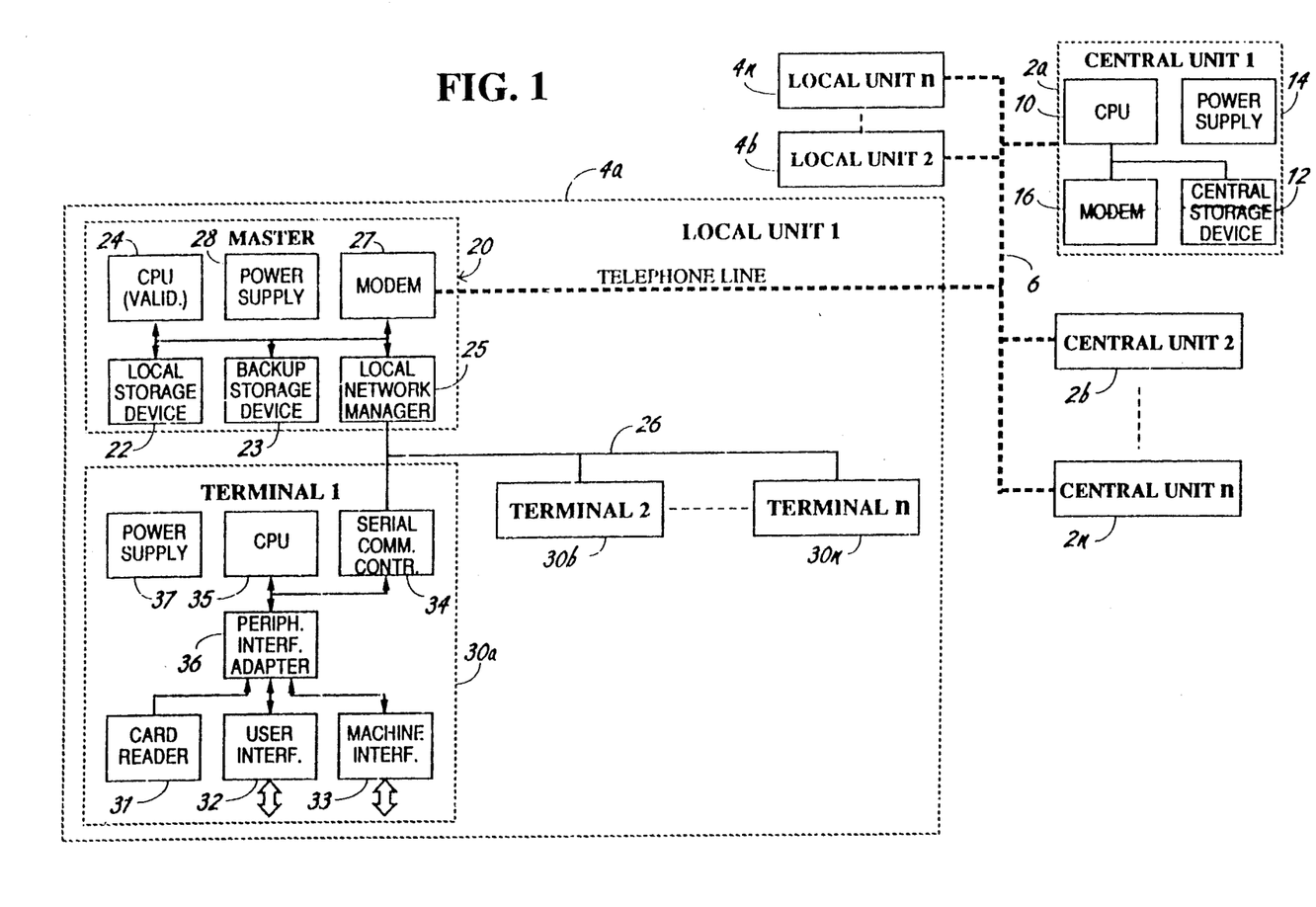
FIG. 1 is a block diagram illustrating one form of credit card system constructed in accordance with the present invention.

The credit card system illustrated in FIG. 1 is intended for use with a plurality of existing credit card systems each having its own group of subscribers and its own central data base for approval of the transactions ordered by the respective subscribers and for accumulating the charges of the respective subscribers. As distinguished from the existing credit card systems, however, the system of the present invention also enables low-value transactions to be performed on an economical basis and at high-speed, such as charges by ticket gates, toll booths, vending machines, by minimizing the communication between the local card reader unit and the respective central data base for payment approval before validating the transaction.

Thus, the credit card system illustrated in FIG. 1 comprises a plurality of central units, schematically shown by blocks 2a-2n, each servicing its respective group of subscribers, and a plurality of local units 4a-4n each communicating with all the central units 2a-2n, e.g., via the telephone line 6. Each of the central units 2a-2n may be any one of the existing credit card (or debit card) systems, e.g., Diners Club Card, Eurocard, American Express, etc., and no change is required in those systems. Thus, each of the central units includes its own CPU (central processor unit) 10, central storage device 12 for each subscriber's account, power supply 14, and MODEM 16 for enabling communication via the telephone line 6. Since such central units require no modification in the system of the present invention, further details of their construction and operation are not set forth herein.

Each Local Unit

Each of the local units 4a-4n includes a master unit, generally designated 20, servicing a plurality of terminals 30a-30n. The master system 20 of the respective local unit includes a plurality of local storage devices 22 each assignable to each of the subscribers of the respective local unit. It may also include a backup storage device 23 to provide backup protection. The master system 20 of the respective local unit further includes a CPU 24 which controls the overall operation of the respective local unit, and particularly provides payment validation. The master system further includes a local network manager 25 which effects communication with the terminals 30a-30n of the respective local unit via a communication bus 26. Communication between the master system 20 of the respective local unit 4a-4n, and the various central units 2a-2n is effected via a MODEM 27 communicating with the telephone line 6. The master system 20 further includes a power supply 28 providing power to the respective master system.

Each of the terminals 30a-30n in the respective local unit may be located at a ticket gate, toll booth, vending machine, parking gate, or similar place involving what would normally be called a low-order transaction for the sale of a product or service. As indicated earlier, it would normally not be economically feasible to connect such terminals directly to a central data base because of the costs (and/or time delays) involved in providing normal communication between the two, e.g., to obtain prior approval of the transaction before the transaction is validated. The system illustrated in FIG. 1, however, performs both local and central transactions but minimizes the communication between the local terminals and the central units. Thus, this system performs fewer slow and costly central transactions and many low-cost and high speed local transactions, thereby making such low-value credit card transactions to be economically feasible.

Each User Interface

Thus, each of the terminals 30a-30n includes a card reader 31, a user interface 32 (shown more particularly in FIG. 2), and a machine interface 33, e.g., for controlling a ticket gate, toll gate, vending machine, a parking gate, or any other device controlling a transaction involving the sale of a product or service. The respective terminal communicates with the local network manager 25 of the master system 20 via a serial communication controller 34. Each terminal 30a-30n further includes a CPU controlling the overall operation of the terminal, a peripheral interface adaptor 36 between the CPU and the card reader 31, user interface 32 and machine interface 23, and a power supply 37.

The overall operations of the CPU 24 in the master system 20, and the CPU 35 in the terminals 30-30n, are described below particularly with reference to the flow charts illustrated in FIGS. 3-7.

Figure 2:
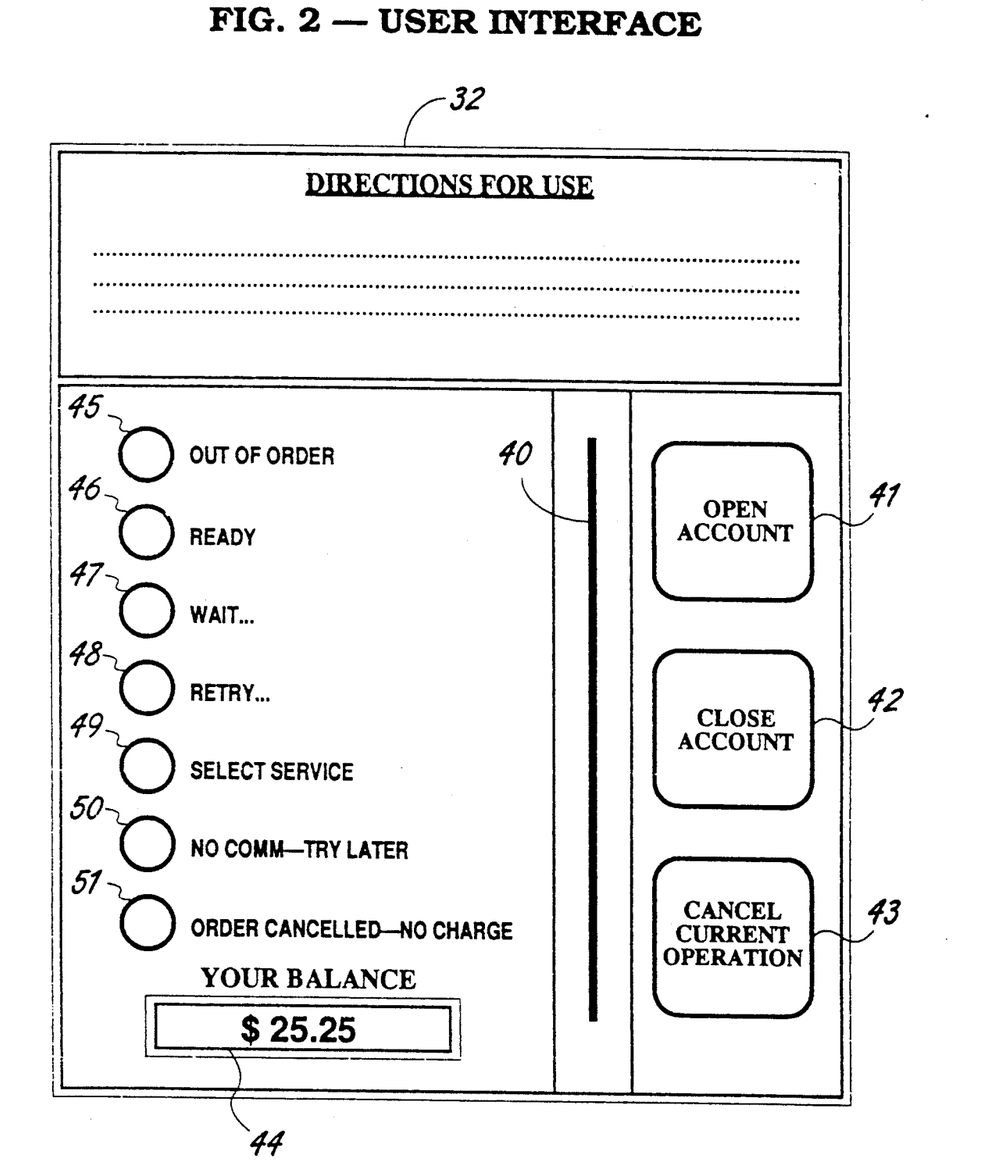
FIG. 2 illustrates the user interface at each of the local units in the system of FIG. 1.
Figure 2A:
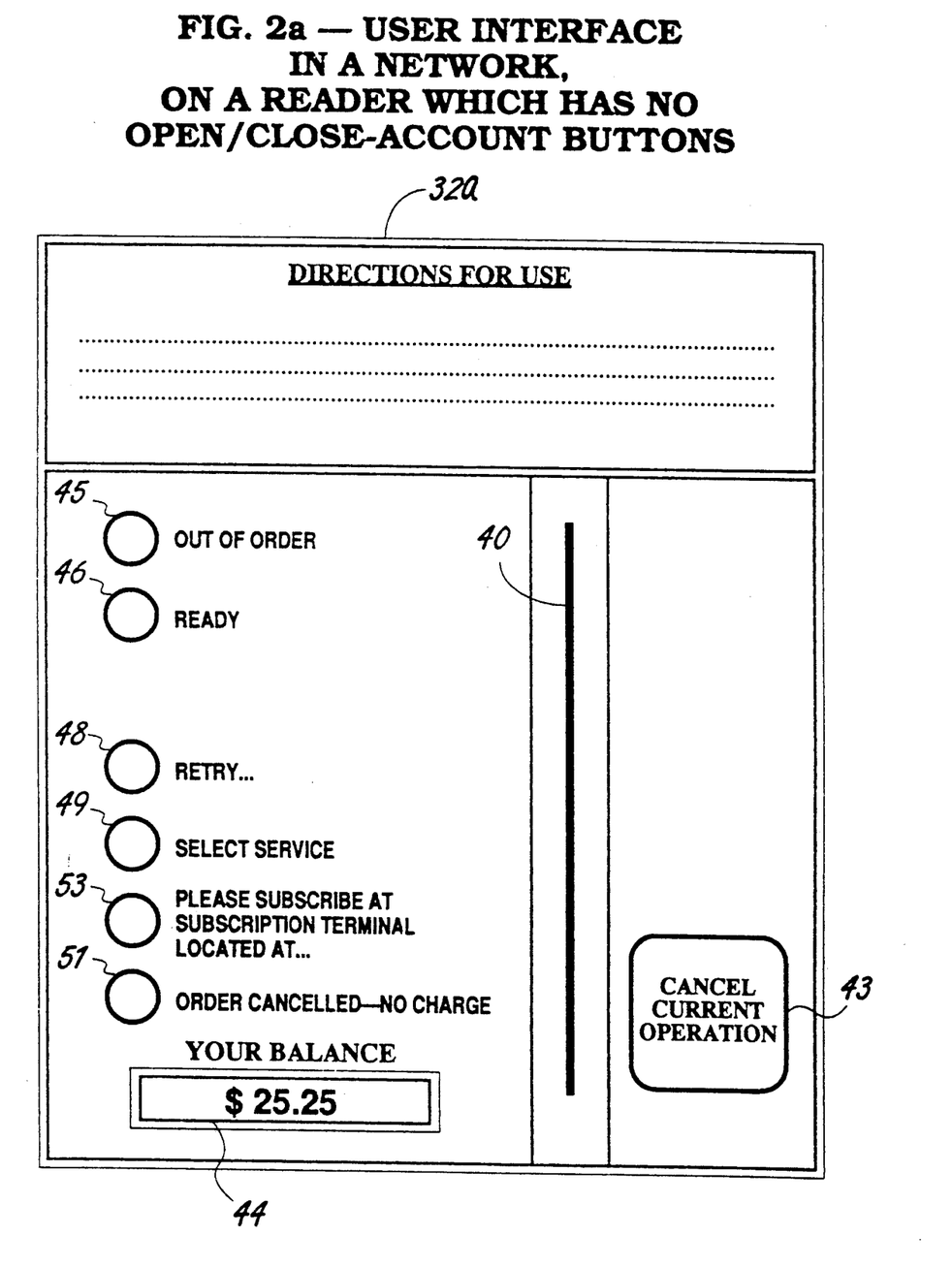
FIGS. 2a-2c illustrate variations in the user interface unit of FIG. 2.
Figure 2B:
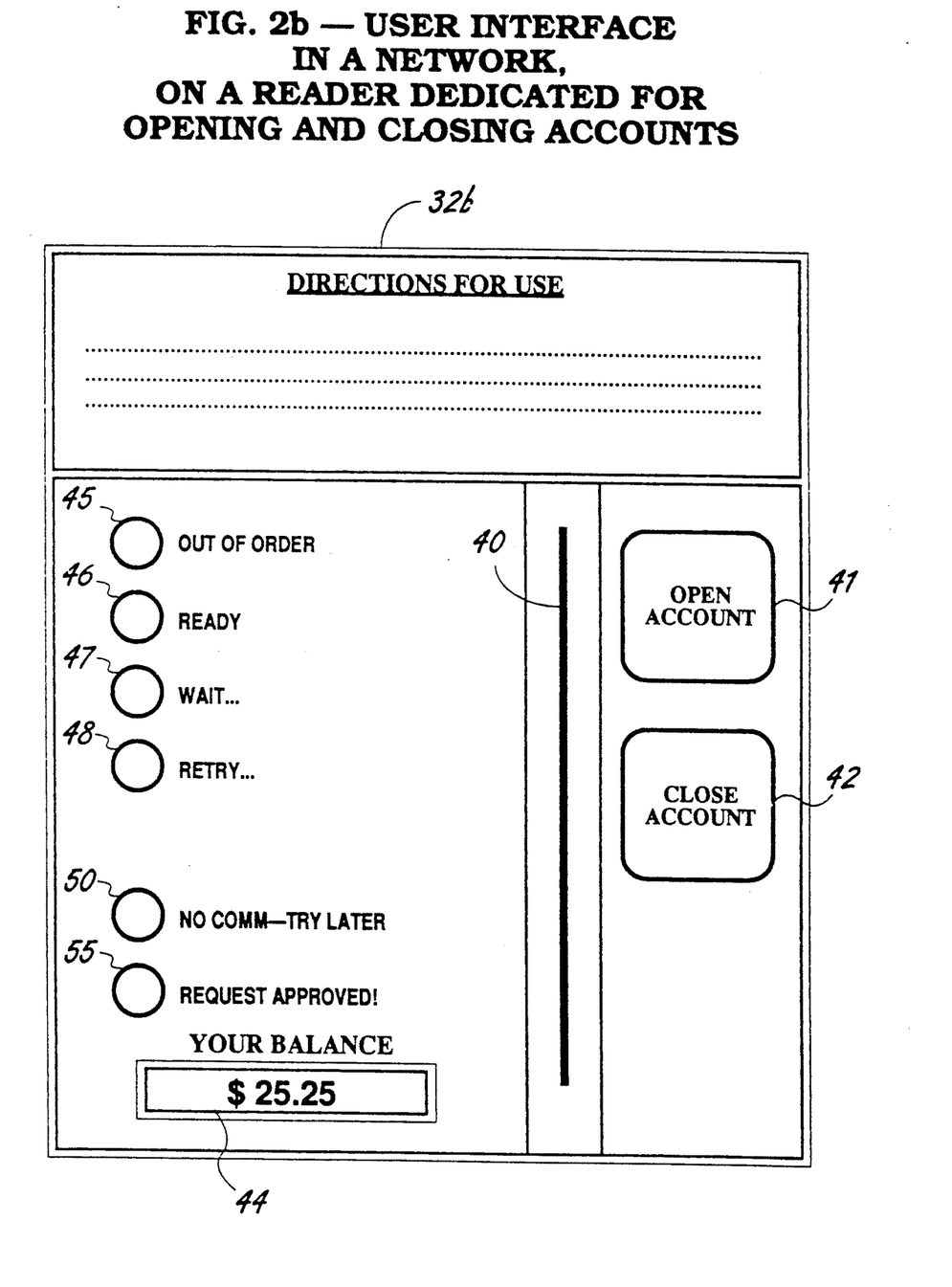
Figure 2C:
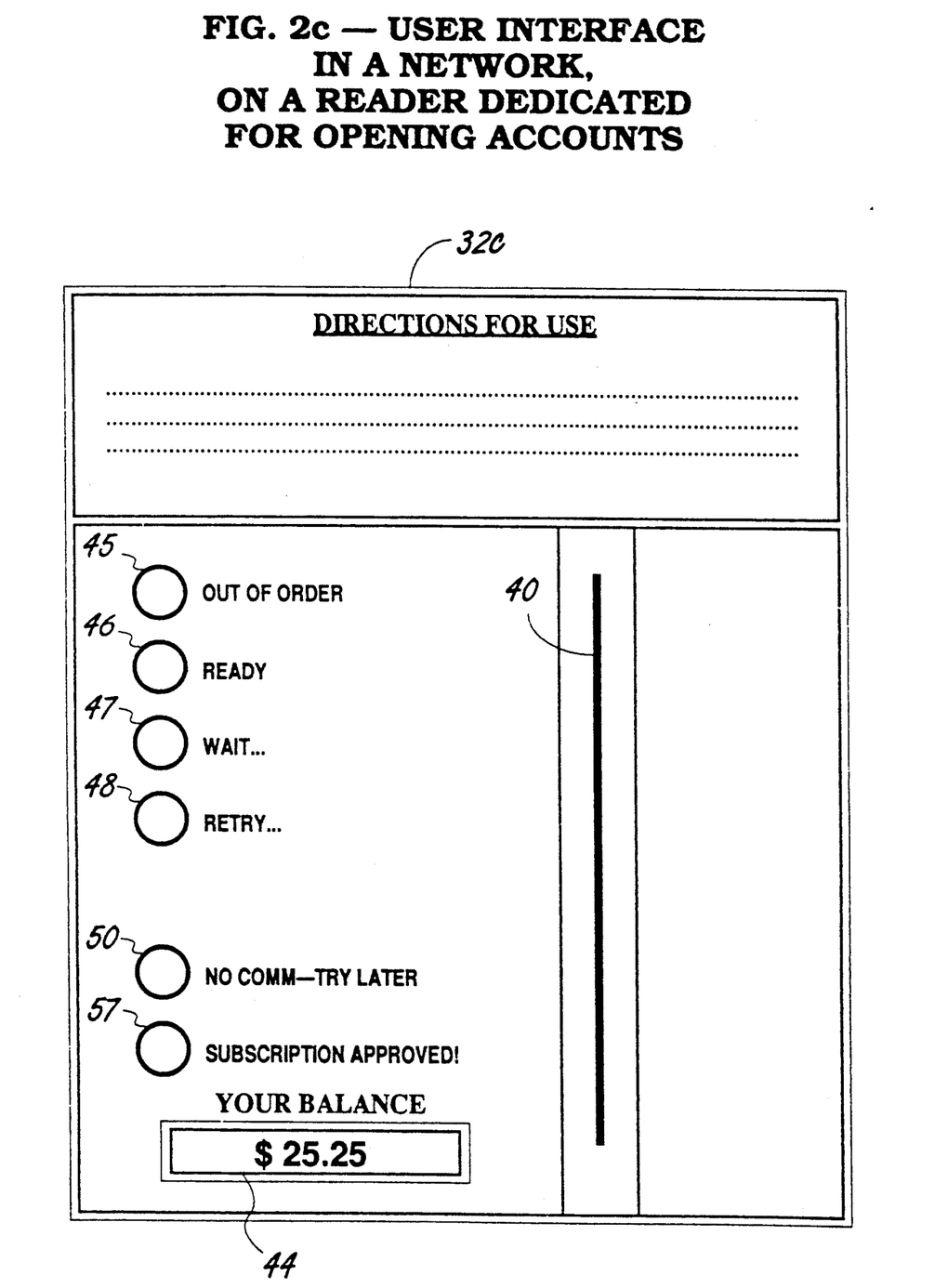

FIG. 2 more particularly illustrates a general form of the interface unit 32 in each of the terminals 30a-30n, which unit is the most comprehensive and is capable of performing the maximum functions. FIGS. 2a-2c illustrate variations in the general interface unit 32 of FIG. 2, for applications wherein all of the functions of the interface unit 32 are not required.

Thus, the user interface 32 (in FIG. 2) includes a card slot 40 for receiving the subscriber's credit card; an Open-Account button 41 to be depressed by the subscriber when opening a local account, a Close-Account button 42 which may also be depressed by the subscriber when closing a local account, and a Cancel Current Operation button 43 which may be depressed by the subscriber any time after a card has been inserted but before the ordered product or service has been supplied, in order to cancel the ordered transaction. The Close-Account button 42 is preferably a "protected button", to prevent inadvertent depression; for example, it may be normally covered by a cover which has to be manually opened before the subscriber has access to it; it may require simultaneous depression with another button; or it may require that the button be retained depressed while the card is moved within the card reader slot 40.

The user interface unit 32 for each terminal further includes a display, generally designated 44, which displays the current local balance of the subscriber, i.e., the balance recorded in the local storage device 22 of the master system 20 for the respective subscriber.

The user interface unit 32 further includes the following light indicators: an Out-of-Order indicator 45, which is energized when the respective terminal is out of order; a Ready indicator 46 (e.g., a green light), which is energized when the respective terminal is ready for performing an operation; a Wait indicator 47, which is energized during the time the local unit is communicating with the central unit; a Retry indicator 48, which is energized whenever an inserted card is not readable or a selection made by the subscriber is not available; a Select Service indicator 49, which is energized to inform a subscriber to make a selection, e.g., in a vending machine (this indicator being omitted in a terminal not involving a selection); an indicator 50 which is energized whenever there is no communication with a central unit 2a-2n, or when the central unit does not approve of a transaction (e.g., lost card), or whenever approval of a new member is denied for any reason; and an indicator 51 which is energized whenever an order is cancelled for any reason to inform the subscriber that his account has not been charged.

OPERATION

Figure 3:
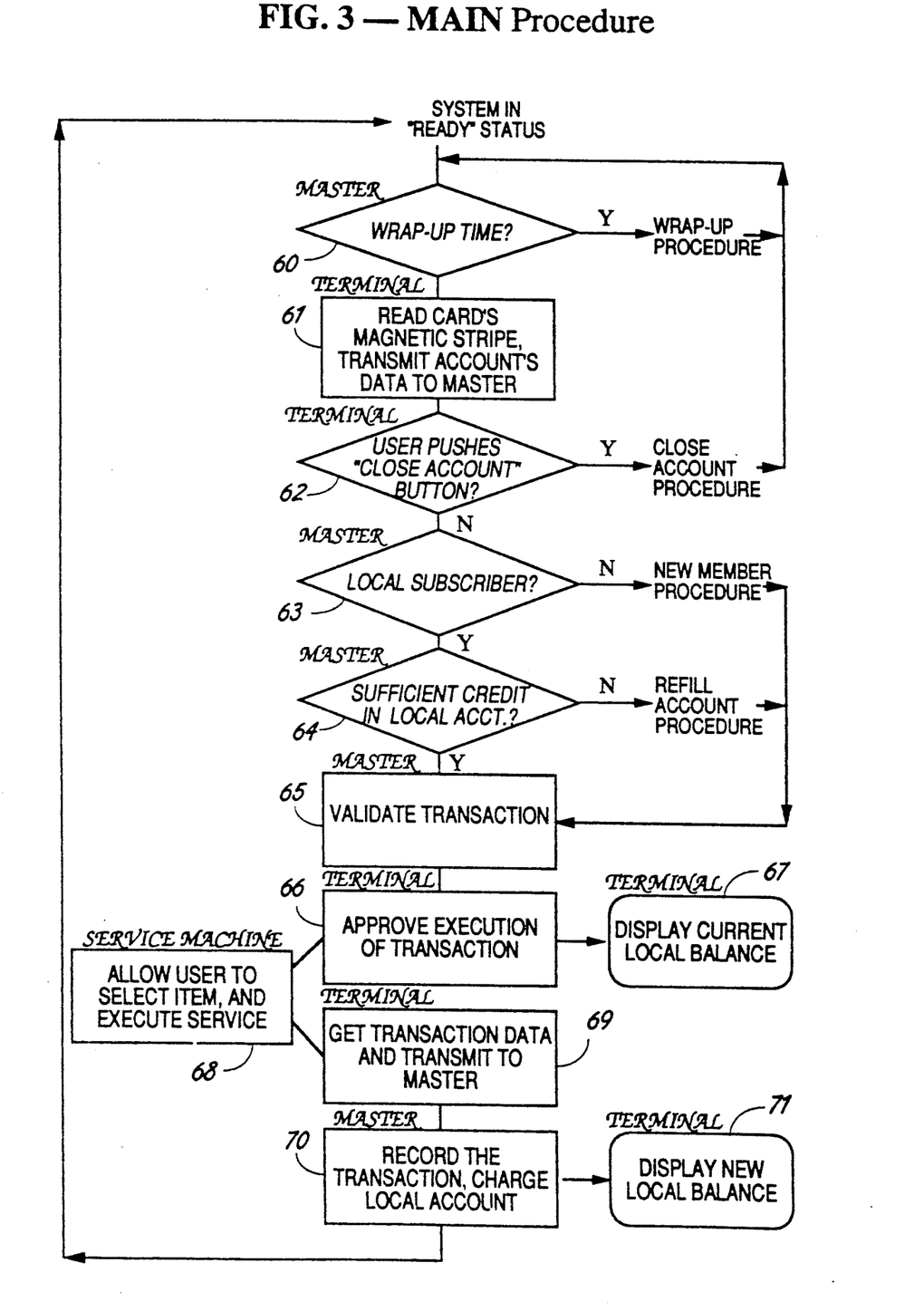
FIG. 3 is a flow chart of the Main procedure of the system of FIG. 1.

Main Procedure (FIG. 3)

FIG. 3 illustrates the Main Procedure which is effective whenever the system is in the Ready state, as indicated by the energization of indicator 46 (FIG. 2).

In the described system, a wrap-up procedure is executed once a day, e.g., at night where there is a very low-volume traffic between the local units 4a-4n and the central units 2a-2n. This wrap-procedure is described below with respect to FIG. 7. The system checks determine whether the "wrap-up" time has arrived (block 60), and if so, it executes the wrap-up procedure to be described below with reference to FIG. 7.

The respective terminal 30a-30n of the respective local unit 4a-4n then reads the magnetic stripe of the card inserted into the card slot 40 of the respective terminal, and transmits the account number of the card to the master system 20 for the respective local unit (block 61).

The terminal then checks to see whether the subscriber has pushed the Close-Account button 42 (block 62), and if so, executes the Close-Account procedure to be described below with respect to FIG. 4. The master system 20 for the respective local unit then checks to determine whether the inserted card identifies a subscriber's account in the local data base, i.e., one who has had assigned to it a local storage device 22 (block 63); if not, it executes the New Member procedure described below with respect to FIG. 5. If, however, the inserted card identifies an existing subscriber for the respective local unit, the master system 20 for the respective local unit then checks to determine whether that particular local subscriber has sufficient credit in the local data base, i.e., in the local storage device 22 (block 64); if not, it executes a Refill Account procedure, as described below with respect to FIG. 6.

If the subscriber inserting the credit card has an existing local account and that local has a sufficient credit, the master system 20 for the respective local unit then transmits its approval, i.e., validates the transaction, to the terminal 30a-30n receiving the credit card (block 65), and the respective terminal approves the execution of the transaction, e.g., sale of product or service ordered by the subscriber (block 66).

Before the transaction is actually executed, the balance in the subscriber's local account is displayed in display 44 (block 67), and then the subscriber is allowed to execute the transaction, e.g., select an item from a vending machine, open a parking gate (block 68). After the transaction has been executed, the respective terminal obtains the transaction data, e.g., the cost of the transaction, and transmits it to the master system 20 for the respective local unit (block 69); the master then records the transaction, charging the respective subscriber's account, by subtracting the cost of the transaction from the amount stored in the subscriber's local storage device 22 (block 70), and then displays the new balance in the display 44 of the respective terminal (block 71), following which the system returns to its ready status.

Figure 4:
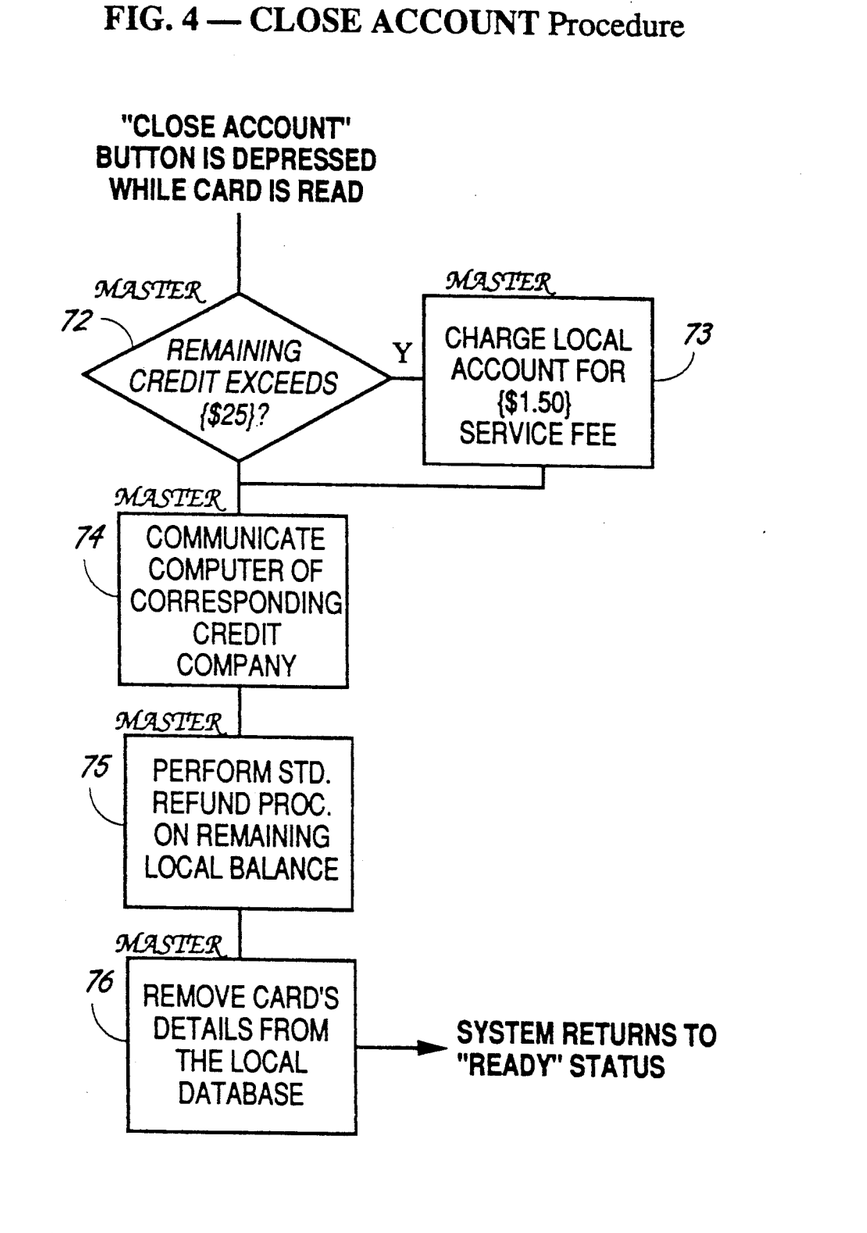
FIG. 4 is a flow chart of the Close-Account procedure in the system of FIG. 1.

Close-Account Procedure (FIG. 4)

As shown in FIG. 4, if the terminal finds that the user had depressed the Close-Account button (42, FIG. 2) in the Main procedure (block 62), the master system 20 first makes a determination of whether the remaining credit, as stored in the local storage device (22, FIG. 1) for the respective subscriber exceeds $25.- (block 72, FIG. 4). If yes, the master system charges the local account a service fee of $1.50 (block 73), and then establishes communication with the computer of the corresponding credit company, i.e., the corresponding central unit 2a-2n, FIG. 1 (block 74, FIG. 4). If this amount was not exceeded in the local account, this communication is established without the service fee charge.

The master system 20 for the respective local unit (4a-4n) then performs a standard refund procedure on the remaining local balance, i.e., as the amount of the local balance to the subscriber's central storage unit, and then removes the card's details from the local data base, i.e., from the local storage device 22 (block 76), whereupon the system returns to Ready status.

Figure 5:
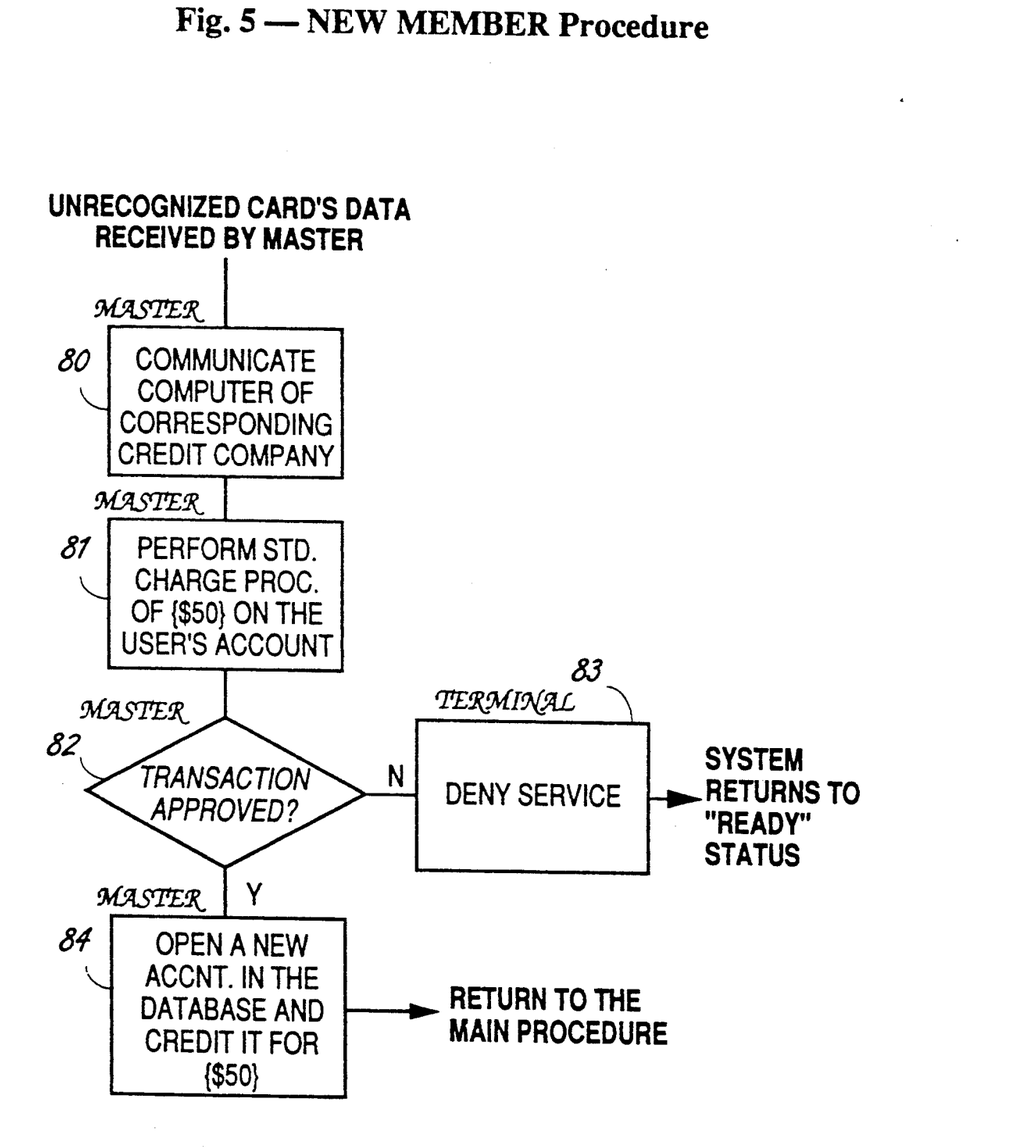
FIG. 5 is a flow chart of the New Member procedure in the system of FIG. 1.

New Member Procedure (FIG. 5)

As shown in FIG. 5, if, during the Main procedure (FIG. 3), the master system 20 in the respective local unit 4a-4n does not recognize that the card inserted into the card reader slot 40 of the local terminal identifies a card that is already in the local data base, i.e., as belonging to a subscriber who has already been assigned a local storage device 22, per block 63 in FIG. 3, the master system 20 communicates with the computer of the credit company identified by the inserted card (block 80), and then performs a standard charge procedure of a predetermined amount (block 81), e.g., $50.-, on the user's account in the data base of the credit company, i.e., the central unit 2a-2n identified by the inserted credit card. The master system 20 is informed whether the transaction has been approved by the corresponding central unit 2a-2n (block 82), and if not, it informs the terminal 30a-30n in which the card was inserted to deny service (block 83), and then returns the system to the Ready status. If, however, the transaction was approved by the respective central unit 2a-2n, the master system 20 for the respective local unit then opens a new account in the data base of the local unit, i.e., assigns a local storage device 22 to the subscriber, and credits that storage device with the predetermined amount, e.g., $50.- (block 84), and then returns to the Main procedure illustrated in FIG. 3.

Figure 6:
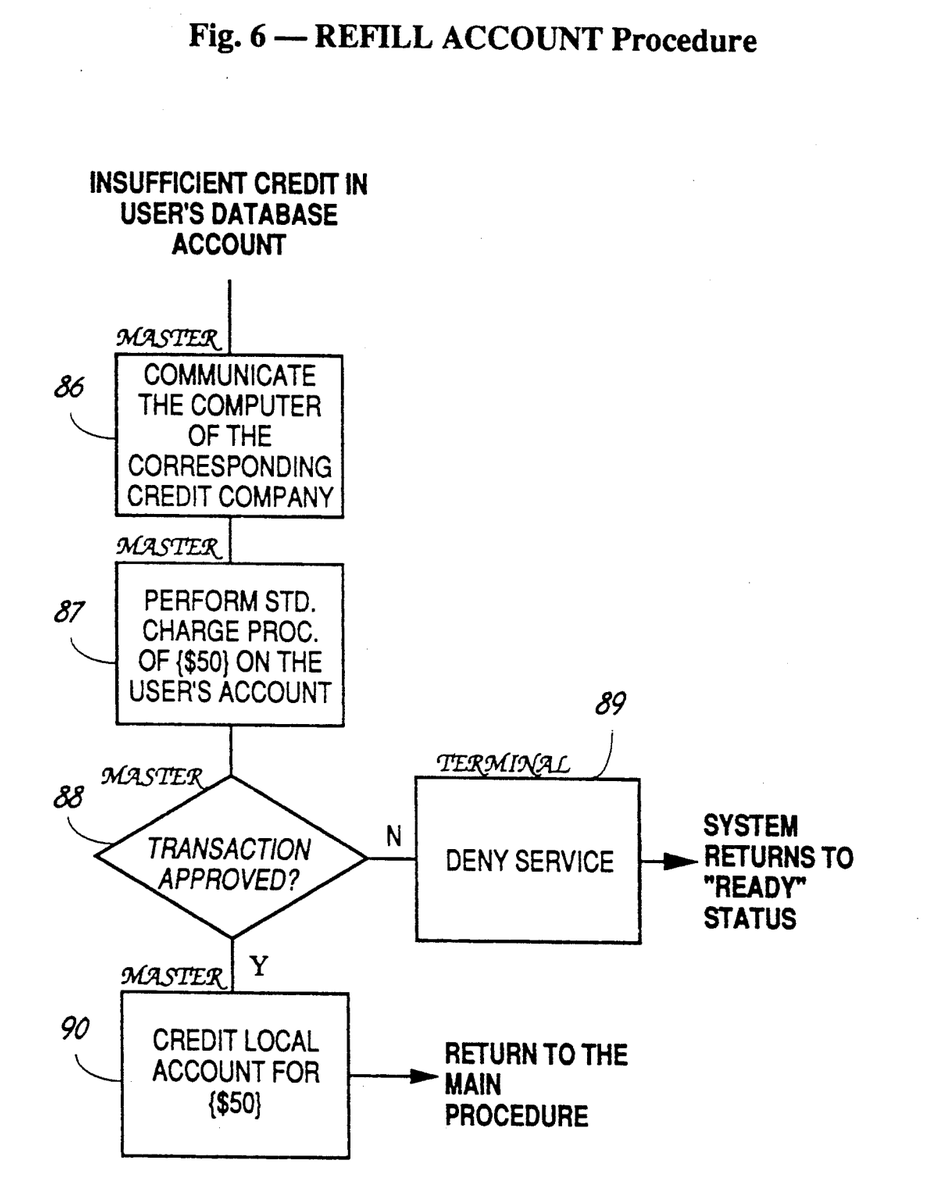
FIG. 6 is a flow chart of the Refill Account procedure in the system of FIG. 1.

Refill Account Procedure (FIG. 6)

As shown in FIG. 6, if during the Main Procedure illustrated in FIG. 3, the master system 20 for the respective local unit 4a-4n determines that insufficient credit is available in the data base of the local unit, i.e., in the local storage device 22 assigned to the subscriber of the inserted card, per block 63 in FIG. 3, the master system 20 communicates with the computer of the corresponding credit company, i.e., the central unit 2a-2n identified by the inserted credit card (block 86, FIG. 6), and then the master system performs a standard charge procedure, charging the central storage unit of the respective subscriber with a specified sum (e.g., $50.-), and crediting the local storage device 22 of the subscriber with the same amount (block 87). The master system then is informed by the computer of the central unit whether the transaction is approved (block 88). If not, the master section commands the terminal in which the card had been inserted to deny the requested service (block 89), and the system returns to the Ready status. However, if the transaction was approved in block 88, the local storage device 22 for the subscriber is credited with the specified amount ($50.-) (block 90), and the computer in the local unit then returns to the Main procedure as illustrated in FIG. 3.

Figure 7:
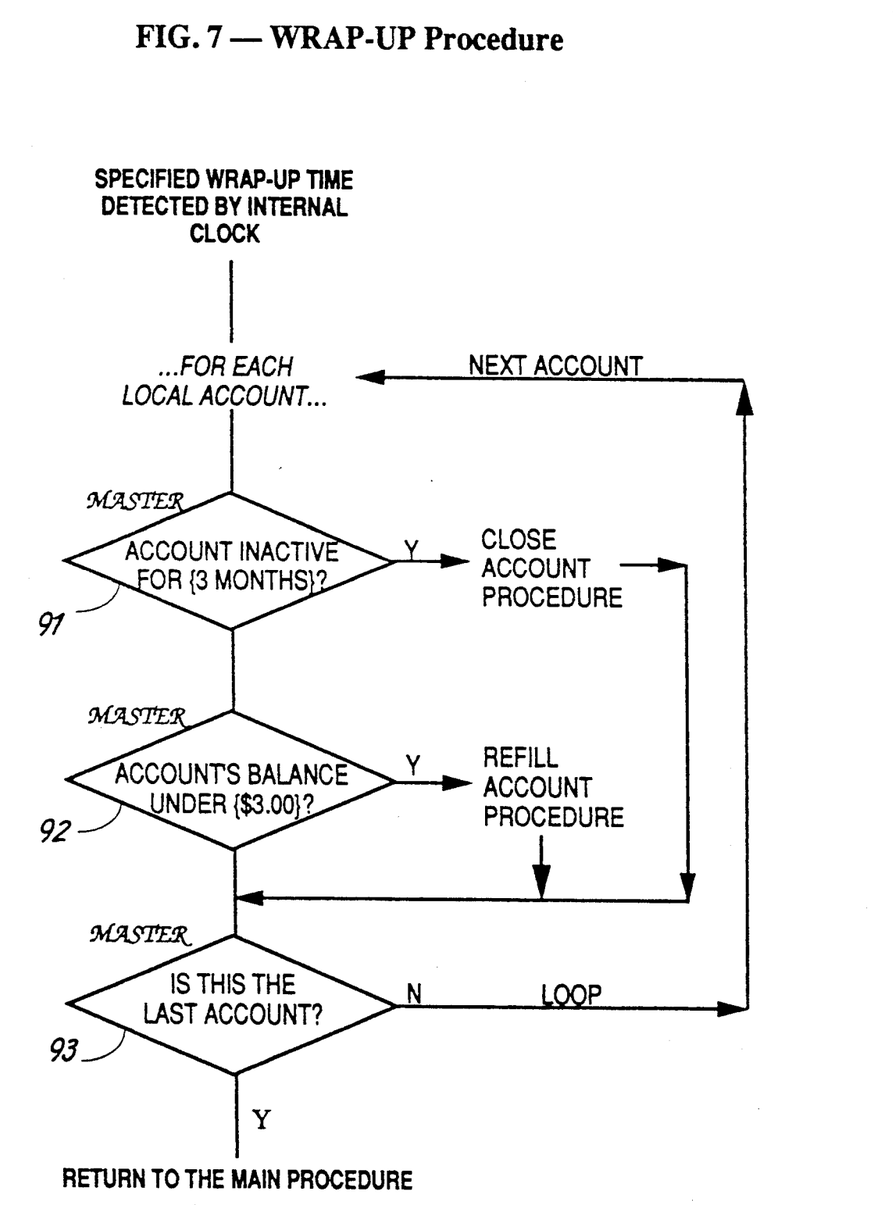
FIG. 7 is a flow chart of the Wrap-Up procedure in the system of FIG. 1.

Wrap-Up Procedure (FIG. 7)

FIG. 7 illustrates the Wrap-Up procedure which is executed at a predetermined time of day, e.g., at night, when the line traffic is very low. As shown in FIG. 7, if the specified hour has been detected, by an internal clock (block 60, FIG. 3), the master system 20 for the respective local unit checks the local storage device 22 of each local subscriber to determine whether the account has been inactive for a predetermined period of time, e.g., greater than three months (block 91). If yes, it executes the Close-Account procedure described above with respect to FIG. 4. If not, the master checks to determine whether the balance in the account is below a specified amount, e.g., $3.- (block 92). If yes, it executes the Refill Account procedure described above with respect to FIG. 6.

If the account has not been inactive for the specified period of time, and its balance is over the specified minimum, the master then checks to determine whether that is the last account (block 93), and if not, it reexecutes the above-described loop for the next account. When the last account has been checked, the master system returns to the Main procedure, described above with respect to FIG. 3.

Modified User Interface Units 32a-32c (FIGS. 2a-2c)

The user interface units 32a, 32b and 32c, illustrated in FIGS. 2a, 2b and 2c, respectively, are stripped-down versions of user interface unit 32 of FIG. 2, and differ from it in the following respects:

User interface unit 32a (FIG. 2a) is particularly useful in local networks requiring rapid transactions, such as payments at ticket gates, phone booths, vending machines and the like. Thus, unit 32a does not include an Open-Account button (41), nor a Close-Account button (42), nor does it include the Weight indicator (47) or the No Comm-Try Later indicator (51). Instead, it includes an indicator 53 which refers non-locally subscribed users to terminals with an Open-Account button (41) such as illustrated in FIGS. 2a, 2b and 2c. Thus, interface unit 32a serves to identify locally subscribed users and provides them with rapid service.

User interface unit 32b (FIG. 2b) is particularly useful in local networks which have rapid transaction readers (interface unit 32a, FIG. 2a) for already subscribed users. New users may open local subscriptions at interface unit 32b which would be situated in a central location close to interface unit 32a. In comparison to interface unit 32 (FIG. 2), unit 32b has an Open-Account button 41 and a Close-Account button 42, but does not have the Select Service indicator 49 or the Order Cancelled indicator 51. Instead, it has a Request Approval indicator 55 which would confirm that a local subscription has been approved and that the user may now enjoy the services offered by rapid transaction interface unit 32a. Conversely, interface unit 32b may also be employed by locally subscribed users to close their respective subscriptions.

User interface unit 32c (FIG. 2c) is particularly useful in local networks having rapid transaction readers (interface unit 32a, FIG. 2a), and a large demand for opening new local subscriptions. Thus, interface unit 32c functions as a terminal dedicated to opening new local subscriptions, and serves to further complement interface unit 32b of FIG. 2b. However, unlike interface unit 32b, unit 32c has no Close-Account button 42. The Open-Account button 41 has also been eliminated, and instead the Open-Account function becomes automatic, upon the insertion of the user's credit card, via an automatic Open-Account means connected to card reader function 40. Further, in comparison to interface unit 32 (FIG. 2), unit 32c has no select service indicator 49, nor an Order Cancelled indicator 51; instead, it has a Subscription Approved indicator 57.

In all other respects, the indicators, buttons and displays of interface units 32a, 32b, 32c function and operate as described above for interface unit 32 (FIG. 2). It should be noted, however, that indicator 53 (FIG. 2a), indicator 55 (FIG. 2b), and indicator 57 (FIG. 2c), function in the following manner:

Indicator 53 is energized when the inserted card is not identified as a local subscriber, in which case display 44 is activated to refer the user to a terminal (situated close by) where such service is provided, e.g., at interface units 32, 32b, 32c. Indicator 55 is energized once the user has either opened or closed a local account, and indicates that such operation has been carried out. The Open/Close Account procedure is as described above for interface 32 (FIG. 2). Indicator 57 is energized upon approval from the central unit that a local subscription may be opened, and it indicates that such action has been carried out. In the case of interface unit 32c where no Open Account button is present, insertion of the card into the reader 40 automatically activates the Open Account procedure described above for interface unit 32 of FIG. 2, and also in the Operation procedure of FIGS. 3 and 5.

Thus, in local networks a variety of user interfaces may be employed together or separately, to enable rapid and economical deployment of the system. For example, in a subway station, user interface unit 32a may be placed at each ticket gate to allow local subscribers rapid payment for train tickets. User interface units 32, 32b and 32c may be centrally located on each platform and/or at the entrances into the station, to allow non-subscribers to open local accounts, and subsequently to enjoy the services offered, such as rapid, economical payment of train tickets. Thus, congestion at the ticket gates is prevented, and new subscriptions may be readily achieved by simply using a credit card.

The described credit card system thus enables credit cards (also debit cards) to be used with low-value transactions while minimizing the relatively expensive communication with central units (the credit card data basis). Thus, the novel system improves customer service by enabling random passersby to become regular local subscribers by simply using their credit cards to open local subscriptions; it thus increases sales per customer since most people have less resistance to use credit than to spend cash. The described system also minimizes costs and hazards associated with cash usage, since there are no collection expenses and losses, and no possibility of burglary. The described system also permits flexible pricing, since price-lists can be programmed to change its specified hours or days to regulate the demand. Further, customer service time is minimized since the system increases overall turnover and minimizes the required number of costly service points. Finally, the described system, at least at the local level, is based on prepayment, thereby minimizing accounting expenses and losses.

The system may include many other features, for example dumping of memories to a back-up computer, transmission of status reports, inventory reports, etc. It will therefore be understood that the credit system illustrated in the drawings is but one example of the invention, and that many other variations, modifications and applications of the invention may be made.

What is claimed is:

1. A credit card system for a plurality of subscribers each having a subscriber account and a credit card identifying the subscriber's account, comprising:
    a central unit and a plurality of local units communicating with said central unit;
    said central unit including a central storage device for each subscriber's account for storing amounts to be charged to the respective subscriber's accounts;
    each of said local units including:
    a plurality of local storage devices assignable to said subscriber's accounts;
    at least one card reader for receiving a subscriber's card when inserted therein to order a transaction involving the sale of a product or service, and for identifying the subscriber's account;
    an Open-Account means enabling a subscriber of the central unit, upon inserting the subscriber's card into the card reader of the local unit, to open a local account in the respective local unit, to be assigned a local storage device, and to transfer and store a predetermined amount from the subscriber's account at the central storage device to the subscriber's local storage device;
    validating means for comparing the cost of the ordered transaction with the amount stored in the subscriber's local storage device, and for validating the transaction if said cost does not exceed said stored amount by a specified permitted sum; and
    means effective upon validating the transaction for subtracting the cost thereof from the amount stored in the subscriber's local storage device.

2. The system according to claim 1, wherein each of said local units further includes:
    display means for displaying whether or not the transaction has been validated, and the amount remaining in the subscriber's local storage device.

3. The system according to claim 1, wherein each of said local units further includes means, effective when the amount stored in the local storage unit drops below a specified minimum, to automatically transfer a predetermined amount from the subscriber's central storage device to the subscriber's local storage device.

4. The system according to claim 1, wherein each of said local units further includes:
    a depressible Close-Account button enabling a subscriber, upon inserting his credit card into the card reader of the local unit, to close the subscriber's local account and to retransfer the balance in the subscriber's local storage device to the subscriber's central storage device.

5. The system according to claim 1, wherein each of said local units further includes:
    means, effective upon the local storage device of a specific subscriber being inactive for a specified period of time, to automatically close the local account of the respective subscriber and to retransfer the balance in the subscriber's local storage device to the subscriber's central storage device.

6. The system according to claim 1, wherein there are a plurality of central units for different groups of subscribers;
    each of said central units including a central storage device for each subscriber of the respective group for storing amounts to be charged to the subscribers of the respective group;
    all said central units communicating with said plurality of local units.

7. The system according to claim 1, wherein at least one of said local units includes a local network servicing has a plurality of card readers at least one of which has an Open-Account means.

8. A credit card system for a plurality of subscribers each having a subscriber account and a credit card identifying the subscriber, comprising:
    a central unit and a plurality of local units for selling a product or service and communicating with said central unit;
    said central unit including a central storage device for each subscriber's account for storing amounts to be charged to the respective subscriber's account;
    each of said local units including:
    a plurality of local storage devices assignable to said subscriber's accounts;
    at least one card reader for receiving a subscriber's card when inserted therein to order a transaction involving the sale of a product or service, and for identifying the subscriber's account;
    an Open-Account means enabling a subscriber of the central unit, upon inserting the subscriber's card into the card reader of the local unit, to open a local account in the respective local unit, to be assigned a local storage device, and to transfer and store a predetermined amount from the subscriber's central storage device to the subscriber's local storage device;
    validating means for comparing the cost of the ordered transaction with the amount stored in the subscriber's local storage device, and for validating and executing the transaction if said cost does not exceed a predetermined amount with respect to said amount stored in the subscriber's local storage device;
    means effective upon validating the transaction for subtracting the cost thereof from the amount stored in the subscriber's local storage device;
    display means for displaying whether or not the transaction has been validated, and the amount remaining in the subscriber's local storage device; and
    means, effective upon the amount stored in the local storage unit dropping below a specified minimum, to automatically transfer a predetermined amount from the subscriber's central storage device to the subscriber's local storage device.

9. The system according to claim 8, wherein each of said local units further includes:
    a depressible Close-Account button enabling a subscriber, upon inserting his credit card into the card reader of the local unit, to close the subscriber's local account and to retransfer the balance in the subscriber's local storage device to the subscriber's central storage device.

10. The system according to claim 9, wherein each of said local units further includes:

means, effective upon the local storage device of a specific subscriber being inactive for a specified period of time, to automatically close the local account of the respective subscriber and to retransfer the balance in the subscriber's local storage device to the subscriber's central storage device.

11. The system according to claim 10, wherein at least one of said local units include a local network servicing a plurality of card readers at least one of which has an Open-Account means.

12. The system according to claim 8, wherein there are a plurality of central units for different groups of subscribers;

each of said central units including a central storage device for each subscriber of the respective group for storing amounts to be charged to the subscribers of the respective group;

all said central units communicating with said plurality of local units.

13. A credit card system for a plurality of subscribers each having a subscriber's account and a credit card identifying the subscriber's account, and including at least one central unit having a central storage device for each subscriber's account for storing amounts to be charged to the respective subscriber's account; characterized in that said system further includes:

a plurality of local units for selling goods or services and communicating with said central unit; each of said local units including:

a plurality of local storage devices assignable to said subscriber's central storage device;

at least one card reader for receiving a subscriber's card when inserted therein to order a transaction involving the sale of a product or service, and for identifying the subscriber's account;

an Open-Account means enabling a subscriber of the central unit, upon inserting the subscriber's card into the card reader of the local unit, to open a local account in the respective local unit, to be assigned a local storage device, and to transfer and store a predetermined amount from the subscriber's central storage device to the subscriber's local storage device;

validating means for validating a transaction if a cost associated therewith does not exceed a predetermined amount with respect to said amount stored in the subscriber's local storage device;

and means effective upon validating the transaction for subtracting the cost thereof from the amount stored in the subscriber's local storage device.

14. The system according to claim 13, wherein each of said local units further includes:

display means for displaying whether or not the transaction has been validated, and the amount remaining in the subscriber's local storage device.

15. The system according to claim 13, wherein each of said local units further includes means, effective when the amount stored in the local storage unit drops below a specified minimum, to automatically transfer a predetermined amount from the subscriber's central storage device to the subscriber's local storage device.

16. The system according to claim 13, wherein each of said local units further includes:

a depressible Close-Account button enabling a subscriber, upon inserting his credit card into the card reader of the local unit, to close the subscriber's local account and to retransfer the balance in the subscriber's local storage device to the subscriber's central storage device.

17. The system according to claim 13, wherein each of said local units further includes:

means, effective upon the local storage device of a specific subscriber being inactive for a specified period of time, to automatically close the local account of the respective subscriber and to retransfer the balance in the subscriber's local storage device to the subscriber's central storage device.

18. The system according to claim 13, wherein at least one of said local units includes a local network servicing a plurality of card readers at least one of which has an Open-Account means.

19. The system according to claim 13, wherein there are a plurality of central units for different groups of subscribers;

each of said central units including a central storage device for each subscriber of the respective group for storing amounts to be charged to the subscribers of the respective group;

all said central units communicating with said plurality of local units.

* * * * *